(12) United States Patent
Newbill

(10) Patent No.: US 8,528,800 B1
(45) Date of Patent: Sep. 10, 2013

(54) SUPPORT STRUCTURE FOR A SPARE TIRE CARRIER ASSEMBLY

(76) Inventor: Anthony Newbill, Wickenburg, AZ (US)

( * ) Notice: Subject to any disclaimer, the term of this patent is extended or adjusted under 35 U.S.C. 154(b) by 1268 days.

(21) Appl. No.: 11/688,781

(22) Filed: Mar. 20, 2007

Related U.S. Application Data

(63) Continuation-in-part of application No. 10/784,654, filed on Feb. 23, 2004, now abandoned.

(51) Int. Cl.
*B62D 43/02* (2006.01)

(52) U.S. Cl.
USPC ......... 224/512; 224/503; 224/516; 224/42.21

(58) Field of Classification Search
USPC .............. 224/502, 505, 506, 509, 512, 517, 224/518, 42.21, 42.24, 42.28; 414/463, 466
See application file for complete search history.

(56) References Cited

U.S. PATENT DOCUMENTS

| | | | |
|---|---|---|---|
| 4,189,074 A * | 2/1980 | Davies | 224/509 |
| 4,679,717 A | 7/1987 | Hansen | |
| 4,971,237 A * | 11/1990 | Davis | 224/506 |
| 5,104,015 A | 4/1992 | Johnson | |
| 5,186,371 A | 2/1993 | Jozefczak et al. | |
| 5,333,766 A | 8/1994 | Fisher | |
| 5,806,736 A | 9/1998 | Kincart | |
| D404,612 S | 1/1999 | Blazevich | |
| 6,189,748 B1 * | 2/2001 | Hutter et al. | 224/42.21 |
| D473,835 S | 4/2003 | Roehmer et al. | |
| 6,659,318 B2 | 12/2003 | Newbill | |
| D505,649 S | 5/2005 | Kenney | |
| D506,421 S | 6/2005 | Newbill | |
| 6,923,351 B2 * | 8/2005 | Roehmer et al. | 224/42.21 |
| 7,021,685 B2 | 4/2006 | Newbill | |
| 2003/0024958 A1 | 2/2003 | Slovick | |
| 2004/0222261 A1 * | 11/2004 | Wilson | 224/509 |

* cited by examiner

*Primary Examiner* — Justin Larson
*Assistant Examiner* — Corey Skurdal
(74) *Attorney, Agent, or Firm* — Greg L Martinez

(57) ABSTRACT

A vehicle includes a vehicle bumper attached to a vehicle frame. A tire carrier support structure is attached to the vehicle frame, wherein the vehicle bumper and tire carrier support structure are held together by a D-ring assembly. A tire carrier assembly having a tire carrier arm repeatably moveable between stowed and deployed positions, and raised and lowered positions, is carried by the tire carrier support structure.

29 Claims, 6 Drawing Sheets

SUPPORT STRUCTURE FOR A SPARE TIRE CARRIER ASSEMBLY

CROSS-REFERENCE TO RELATED APPLICATIONS

This application is a continuation-in-part of Ser. No. 10/784,654, filed Feb. 23, 2004, the contents of which are incorporated herein by reference.

BACKGROUND OF THE INVENTION

1. Field of the Invention

This invention relates generally to vehicles which carry a spare tire.

2. Description of the Related Art

Most vehicles have a spare tire, which can be carried by it at many different locations. For example, some spare tires are carried on the undercarriage of the vehicle, but most of them are carried in the vehicle trunk. Sport utility vehicles, however, typically do not have a trunk so the spare tire must be carried elsewhere. Further, tires for sport utility vehicles are generally large in size and weight, which makes it inconvenient to position them on and remove them from the undercarriage and the vehicle's interior.

Hence, sport utility vehicles often include a spare tire carrier assembly, positioned at their rearward end, for holding the spare tire. Examples of these spare tire carrier assemblies can be found in U.S. Pat. Nos. 5,333,766, 5,186,371 and 5,104,015. However, their use often requires the operator to lift the spare tire, which is strenuous if the spare tire is large and heavy. Further, the difficulty in lifting the spare tire is increased if the vehicle is located on an uneven surface.

BRIEF SUMMARY OF THE INVENTION

The present invention includes a vehicle having a vehicle frame which carries, proximate to its rearward end, a vehicle bumper and a tire carrier support structure. The vehicle bumper and tire carrier support structure are coupled with the vehicle frame by couplers which extend through them. The tire carrier support structure is stronger and more rugged than the vehicle bumper, so it is capable of carrying more weight than the vehicle bumper.

The vehicle also includes a spare tire carrier assembly mounted proximate to its rearward end. The spare tire carrier assembly is mounted so it is repeatably moveable between stowed and deployed conditions. In accordance with the invention, the spare tire carrier assembly is mounted to the tire carrier support structure. In this way, the tire carrier assembly is positioned so that most of its weight is applied to the tire carrier support structure instead of the vehicle bumper. This is useful because the tire carrier support structure is capable of carrying more weight than the vehicle bumper since it is stronger and more rugged. Hence, the tire carrier support structure is less likely to fail in response to carrying the weight of the tire carrier assembly.

The vehicle bumper is more likely to fail in response to carrying the weight of the tire carrier assembly. The capability of the vehicle bumper to support weight, however, is increased because the tire carrier support structure provides support to it. The tire carrier support structure provides support to the vehicle bumper because the support structure is held to the vehicle bumper and extends along its length.

These and other features, aspects, and advantages of the present invention will become better understood with reference to the following drawings and description.

DETAILED DESCRIPTION OF THE INVENTION

Figure 1:
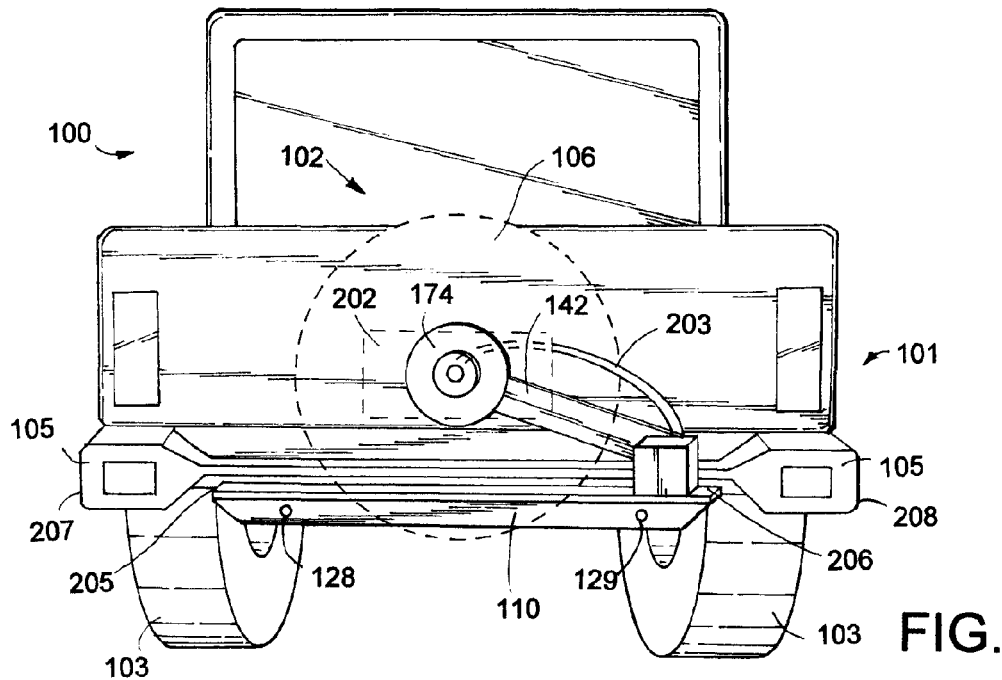
FIGS. 1, 2 and 3 are back, top and side views, respectively, of a vehicle having a vehicle frame which carries a vehicle bumper and tire carrier support structure, in accordance with the invention.
Figure 2:
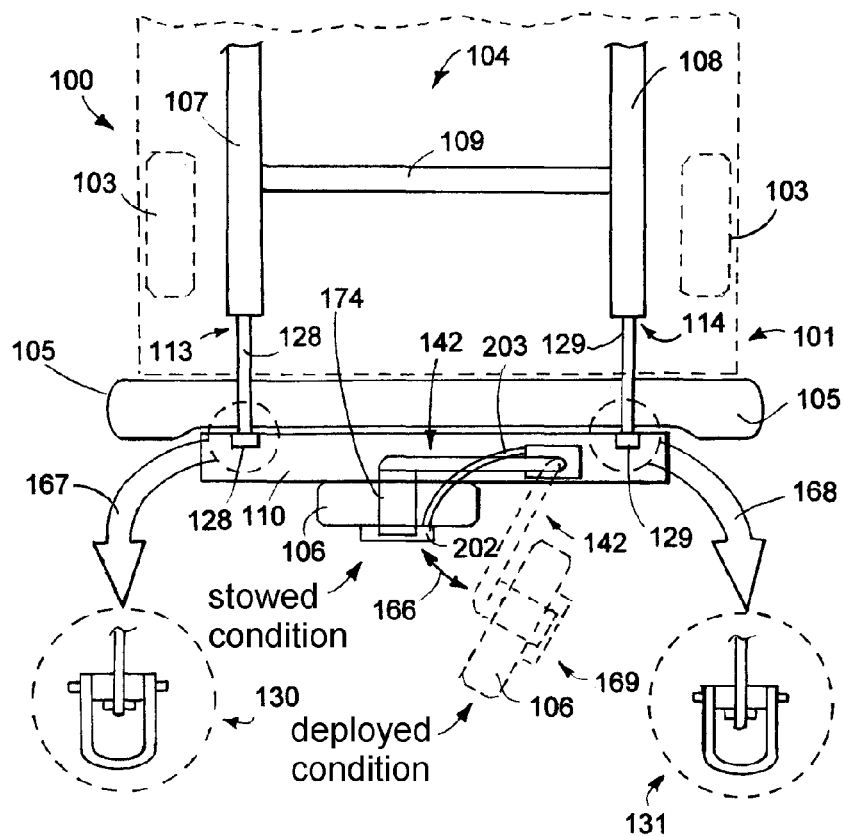
Figure 3:
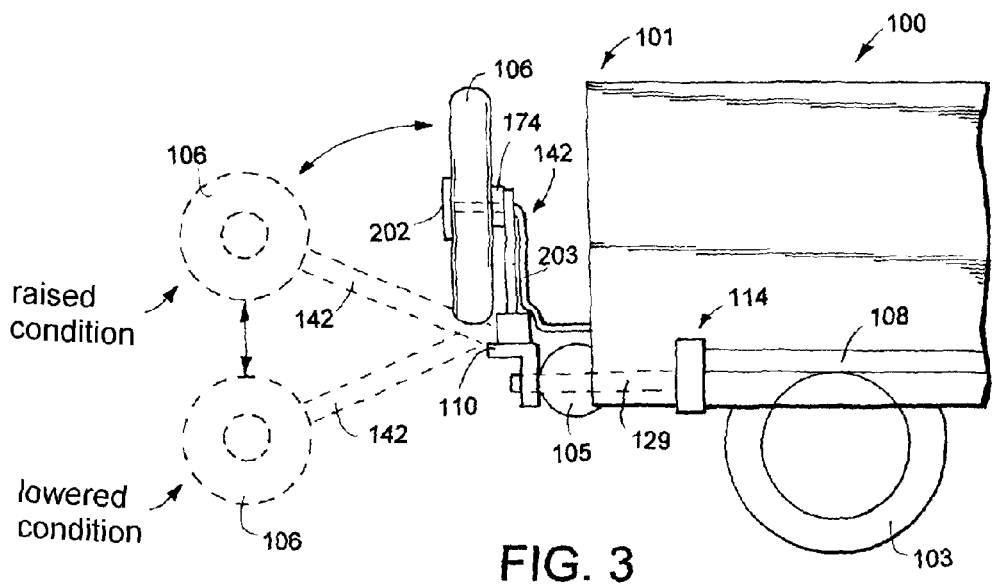

FIGS. 1, 2 and 3 are back, top and side views, respectively, of a vehicle 100, in accordance with the invention. Vehicle 100 can be of many different types, but here it is embodied as a Hummer, which is the civilian version of the military Hum Vee vehicle. In this embodiment, vehicle 100 includes a vehicle frame 104 (FIG. 2) which carries a vehicle bumper 105 and a tire carrier support structure 110 proximate to rear wheels 103 and a rearward end 101 of vehicle 100. It should be noted that tire carrier support structure 110 is stronger and more rugged than vehicle bumper 105, so support structure 110 is capable of carrying more weight than vehicle bumper 105.

It should also be noted that vehicle frame 104 provides support for the components included with vehicle 100, such as its engine, front and rear wheels, suspension and body. In accordance with the invention, vehicle frame 104 also provides support for tire carrier support structure 110 and vehicle bumper 105. In this embodiment, vehicle frame 104 includes longitudinal frame members 107 and 108 extending along the length of vehicle 100 (FIG. 2). Vehicle frame 104 also includes a cross frame member 109 extending between longitudinal frame members 107 and 108. Cross frame member 109 extends along the width of vehicle 100 near its rearward end 101.

Figure 4:
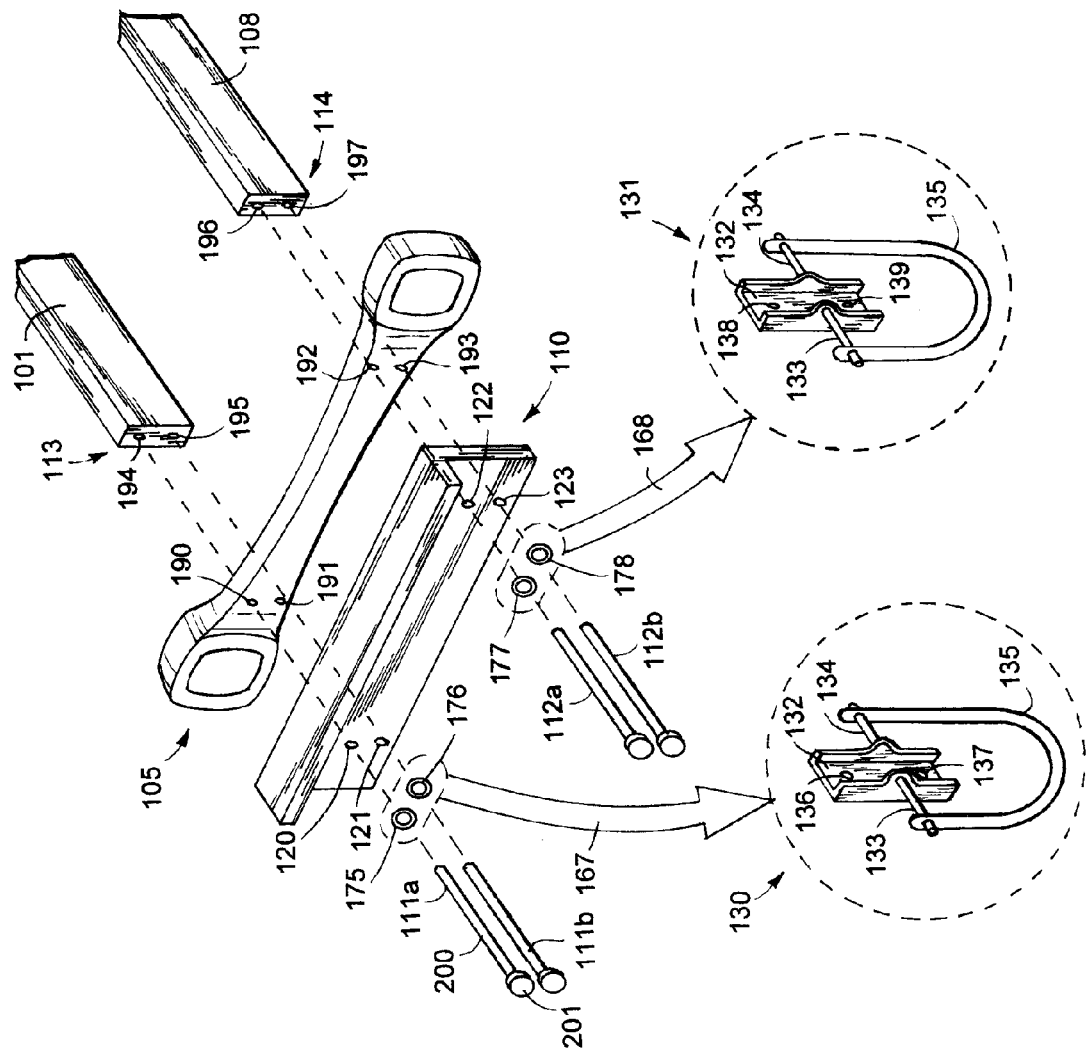
FIG. 4 is an exploded perspective view showing the engagement between the tire carrier support structure, vehicle bumper and vehicle frame of FIGS. 1, 2 and 3.

In this embodiment, tire carrier support structure 110 and vehicle bumper 105 are coupled to vehicle frame 104 with couplers 128 and 129. It should be noted that two couplers are shown in FIG. 1, but more can be used to couple tire carrier support structure 110 and vehicle bumper 105 to vehicle frame 104. An example in which four couplers are used is shown in FIG. 4. Couplers 128 and 129 are generally elongate members which extend through tire carrier support structure 110 and vehicle bumper 105, and are attached to vehicle frame 104. Many different types of elongate members, such as bolts, can be used as couplers 128 and 129. It should be noted that most bolts include a shaft with a bolt head attached to one end. More information regarding couplers and how they couple tire carrier support structure 110 and vehicle bumper 105 to vehicle frame 104 is provided below with FIG. 4.

In this embodiment, vehicle 100 also includes a spare tire carrier assembly 102 for holding a spare tire 106. Spare tire carrier assembly 102 includes a tire carrier arm assembly 142 connected to a hub 174. Hub 174 is for holding spare tire 106. In some embodiments, a license plate 202 is attached to hub 174, although it should be noted that plate 202 can be attached to vehicle 100 at many other locations. A power cable 203 is connected to the power system of vehicle 100 at one end and a license plate light (not shown) at its other end. License plate 202 is illuminated in response to the power system of vehicle 100 providing power to the license plate light. It should be noted that cable 202 can extend from hub 174 in many different ways. In this embodiment, however, it extends along tire carrier arm assembly 142 and through hub 174.

As shown in FIG. 2, spare tire carrier assembly 102 is mounted so it is repeatably moveable between stowed and deployed conditions. When spare tire carrier assembly 102 is in its stowed condition, tire carrier arm assembly 142 is positioned towards tire carrier support structure 110. Further, when spare tire carrier assembly 102 is in its deployed condition, as shown in phantom, tire carrier arm assembly 142 is positioned away from tire carrier support structure 110. Tire carrier arm assembly 142 can be rotatably mounted to tire carrier support structure 110 in many different ways, several of which will be discussed in more detail below with FIGS. 6a and 6b.

In some embodiments, spare tire carrier assembly 102 is also repeatably moveable between raised and lowered conditions, as shown in phantom in FIG. 3. When spare tire carrier assembly 102 is in its raised condition, tire carrier arm assembly 142 is positioned towards tire carrier support structure 110. When spare tire carrier assembly 102 is in its lowered condition, tire carrier arm assembly 142 is positioned so it extends away and downwardly from tire carrier support structure 110. Several embodiments showing the movement of a spare tire carrier assembly between raised and lowered conditions will be discussed in more detail below with FIGS. 7 and 8a-8c.

In accordance with the invention, spare tire carrier assembly 102 is mounted to tire carrier support structure 110 because support structure 110 is capable of carrying more weight than vehicle bumper 105. In this way, tire carrier assembly 102 is positioned so that most of its weight is applied to tire carrier support structure 110 instead of vehicle bumper 105. This is useful because tire carrier support structure 110 is stronger and more rugged than vehicle bumper 105, so it is less likely to fail in response to the weight of spare tire carrier assembly 102 and spare tire 106. Hence, spare tire carrier assembly 102 can include more and heavier components, such as upper and lower arms, an actuator and/or a pivot arm.

The capability of vehicle bumper 105 to support weight is increased because tire carrier support structure 110 provides support to it. Tire carrier support structure 110 provides support to vehicle bumper 105 because it extends along the length of vehicle bumper 105 between couplers 128 and 129. Further, tire carrier support structure 110 provides support to vehicle bumper 105 because it is held thereto by couplers 128 and 129, as will be discussed in more detail with FIG. 4.

In accordance with the invention, tire carrier support structure 110 does not extend along the entire length of vehicle bumper 105. Instead, an end 205 of support structure 110 terminates between coupler 128 and an end 207 of vehicle bumper 105, as shown in FIG. 1. Further, an opposed end 206 of support structure 110 terminates between coupler 129 and an end 208 of vehicle bumper 105. This is useful for many different reasons, such as the bumper standards set forth in the United States by the National Highway Safety Standards Commission and the National Transportation Safety Board. The bumper standards state that a vehicle bumper should be collapsible in response to a large enough force being applied to it, such as the force of a collision.

To allow vehicle bumper 105 to be collapsible, tire carrier support structure 110 does not extend all the way to opposed ends 207 and 208 of vehicle bumper 105. If tire carrier support structure 110 did extend all the way to opposed ends 207 and 208, it could interfere with the ability of vehicle bumper 105 to collapse in response to the force of a collision. This is because, as mentioned above, tire carrier support structure 110 is made of a stronger and more rugged material than vehicle bumper 105. In this way, ends 207 and 208 of vehicle bumper 105 are capable of collapsing in response to the force of a collision, without interference from support structure 110.

FIG. 4 is an exploded perspective view showing the engagement between tire carrier support structure 110, vehicle bumper 105 and vehicle frame 104, with couplers, in accordance with the invention. The couplers can be of many different types, but here they are elongate members embodied as bolts 111a, 111b, 112a and 112b. Bolt 111a includes a bolt shaft 200 with a bolt head 201 attached to one end. The opposed end of bolt shaft 200 is for attaching to vehicle frame 104, and can be threaded if desired. It should be noted that, in this embodiment, bolts 111b, 112a and 112b are the same as bolt 111a.

The bolt head applies a force to tire carrier support structure 110 in response to its corresponding bolt shaft being attached to vehicle frame 104. The force applied by the bolt head holds tire carrier support structure 110 to vehicle bumper 105. In this way, vehicle bumper 105 is held along its length by tire carrier support structure 110 and tire carrier support structure 110 provides support to vehicle bumper 105. It should be noted that the length of vehicle bumper extends between its ends 207 and 208. Further, the length of tire carrier support structure 110 extends between its ends 205 and 206.

The force applied by the bolt head to tire carrier support structure 110 can be applied over a larger area by extending the bolt shaft through a washer. This also increases the area with which tire carrier support structure 110 applies a force to vehicle bumper 105. In this embodiment, bolts 111a, 111b, 112a and 112b are extended through washers 175, 176, 177 and 178, respectively. The amount of support provided to vehicle bumper 105 by support structure 110 increases as the area of the force provided by tire carrier support structure 110 increases. Further, the amount of support provided to vehicle bumper 105 by support structure 110 decreases as the area of the force provided by tire carrier support structure 110 decreases. The force applied by the bolt head to tire carrier support structure 110 can be applied over a larger area by increasing the area of the bolt head and/or the washer. Further, the force applied by the bolt head to tire carrier support structure 110 can be applied over a larger area by replacing the washers with D-ring assemblies, as will be discussed in more detail presently.

As indicated by a substitution arrow 167, washers 175 and 176 can be replaced by a D-ring assembly 130. Further, as indicated by a substitution arrow 168, washers 177 and 178 can be replaced by a D-ring assembly 131. D-ring assemblies 130 and 131 can have many different configurations. In this embodiment, D-ring assemblies 130 and 131 each include a D-ring bracket 132 having opposing arms 133 and 134 extending outwardly therefrom, wherein opposing arms 133 and 134 are coupled with a D-ring 135. D-ring assembly 130 includes throughholes 136 and 137 extending through its D-ring bracket 132 and D-ring assembly 131 includes throughholes 138 and 139 extending through its D-ring bracket 132. Throughholes 136 and 137 are sized and shaped so that bolts 111a and 111b, respectively, can extend through them. Further, throughholes 138 and 139 are sized and shaped so that bolts 112a and 112b, respectively, can extend through them. As will be discussed in more detail presently, tire carrier support structure 110 and vehicle bumper 105 both include throughholes for receiving these bolts.

In this embodiment, tire carrier support structure 110 includes throughholes 120, 121, 122 and 123 extending therethrough and vehicle bumper 105 includes throughholes 190, 191, 192, 193 and 194 extending therethrough. Further, longitudinal frame member 107 includes throughholes 194 and 195 at its end 113 and longitudinal frame member 108 includes throughholes 196 and 197 at its end 114.

Throughholes 120, 190 and 194 can be aligned with each other so that bolt 111a can move through them and be attached to longitudinal frame member 107 at end 113. Further, throughholes 121, 191 and 195 can be aligned with each other so that bolt 111b can move through them and be attached to longitudinal frame member 107 at end 113. Throughholes 120, 192 and 196 can be aligned with each other so that bolt 112a can move through them and be attached to longitudinal frame member 108 at end 114. Further, throughholes 123, 193 and 197 can be aligned with each other so that bolt 112b can move through them and be attached to longitudinal frame member 108 at end 114. In this way, tire carrier support structure 110 and vehicle bumper 105 are coupled to vehicle frame 104 by couplers and tire carrier support structure 110 is held to vehicle bumper 105. Tire carrier support structure 110 can have many different configurations, one of which will be discussed in more detail presently.

Figure 5A:
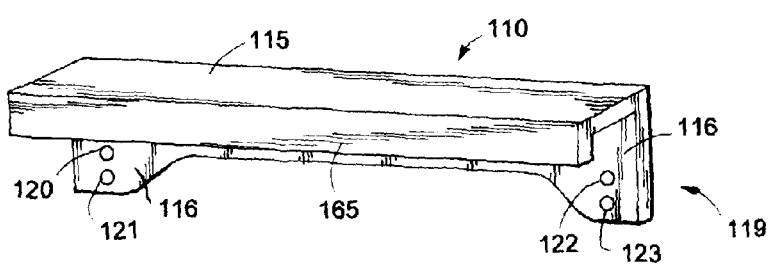
FIGS. 5a and 5b are perspective and side views, respectively, of one embodiment of a tire carrier support structure.
Figure 5B:
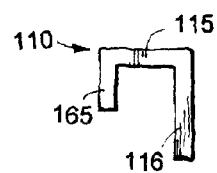

FIGS. 5a and 5b are perspective and side views, respectively, of one embodiment of tire carrier support structure 110. It should be noted that the side view of FIG. 5b is looking in a direction 119 of FIG. 5a. In this embodiment, tire carrier support structure 110 includes a base member 115 with a sidewall member 116 connected to it and extending downwardly therefrom. Tire carrier support structure 110 also includes a lip 165 connected to base member 115 and extending downwardly from it. Base member 115, sidewall member 116 and lip 165 can be connected together in many different ways. For example, they can be connected together because they are made from the same piece or they can be separate pieces connected together, such as by welding.

In this embodiment, lip 165 and sidewall member 116 are on opposed sides of base member 115, and extend parallel to each other. Base member 115, sidewall member 116 and lip 165 are elongate so they extend along the length of vehicle bumper 105 when carried by vehicle frame 104. Sidewall member 116 engages vehicle bumper 105 when tire carrier support structure 110 is carried by vehicle frame 104, and lip 165 is spaced outwardly therefrom by base member 115.

Throughholes 120 and 121 extend through sidewall member 116 at one end and throughholes 122 and 123 extend through sidewall member 116 at its opposed end. The positioning of throughholes 121-123 is chosen to facilitate the coupling of tire carrier support structure 110 and vehicle bumper 105 to vehicle frame 104, as discussed above with FIG. 4. The positioning of throughholes 121-123 is facilitated because they are aligned with corresponding throughholes extending through vehicle bumper 105 and vehicle frame 104. In this way, bolts 111a-111b and 112a-112b can extend through tire carrier support structure 110 and vehicle bumper 105 and be attached to vehicle frame 104.

Figure 6A:
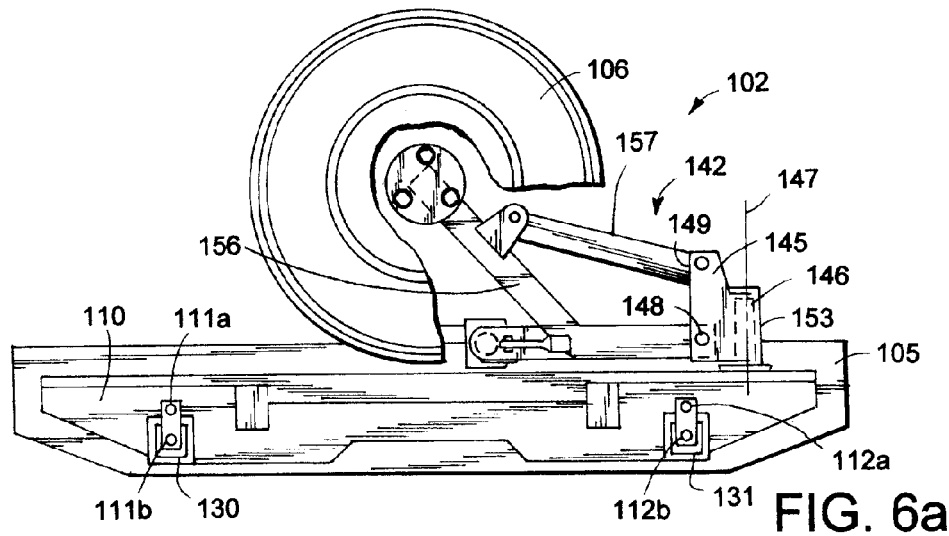
FIG. 6a is a side view of a tire carrier assembly rotatably mounted with a post to the tire carrier support structure of FIG. 1.

FIG. 6a is a back view of tire carrier assembly 102 mounted to tire carrier support structure 110, in accordance with the invention. In this embodiment, tire carrier assembly 102 is mounted so it is repeatably moveable between stowed and deployed conditions. In this embodiment, a post 153 is connected to and extends upwardly from support structure 110. Post 153 can be connected to tire carrier support structure 110 in many different ways, such as by welding. Post 153 and tire carrier support structure 110 can also be a single integral piece.

In this embodiment, tire carrier assembly 102 includes a bracket 145 having a lower connection point 148 for connecting to tire carrier arm assembly 142. Bracket 145 also includes a post sleeve 146 extending therethrough. Post sleeve 146 is sized and shaped to receive post 153 so that bracket 145 can rotate around an axis of rotation of bracket 145, which is indicated by a reference line 147. Hence, tire carrier arm assembly 142 is mounted with tire carrier support structure 110 by coupling it to bracket 145 and mounting bracket 145 to post 153, wherein post 153 is connected to tire carrier support structure 110. In this way, bracket 145 is pivotably mounted to a post connected to tire carrier support structure 110 so that tire carrier arm assembly 142 is repeatably moveable between stowed and deployed positions. It should be noted that tire carrier assembly 102 can be mounted in many other ways so it is repeatably moveable between stowed and deployed conditions, one of which will be discussed in more detail with FIG. 6b.

As mentioned above, tire carrier support structure 110 can be coupled with vehicle frame 104 in many different ways, such as by using bolts and washers. In this embodiment, however, as well as the one shown in FIG. 6b, the washers are replaced by D-ring assemblies 130 and 131, as discussed above with FIG. 4. Here, D-ring assembly 130 is held to tire carrier support structure 110 by bolts 111a and 111b and D-ring assembly 131 is held to tire carrier support structure 110 by bolts 112a and 112b. In this way, D-ring assemblies hold tire carrier support structure 110 to vehicle bumper 105.

In accordance with the invention, tire carrier support structure 110 extends between D-ring assemblies 130 and 130. For reasons discussed above, this allows tire carrier support structure 110 to provide more support to vehicle bumper 105. This also allows tire carrier arm assembly to counteract a larger torque. The torque can be provided in many different ways, such as by extending tire carrier arm assembly 142 further towards D-ring assembly 130. The torque can also be provided by moving tire carrier arm assembly 142 between its stowed and deployed positions. Further the torque can be increased by moving carrier arm assembly 142 between raised and lowered positions, as will be discussed in more detail with FIG. 7.

Figure 6B:
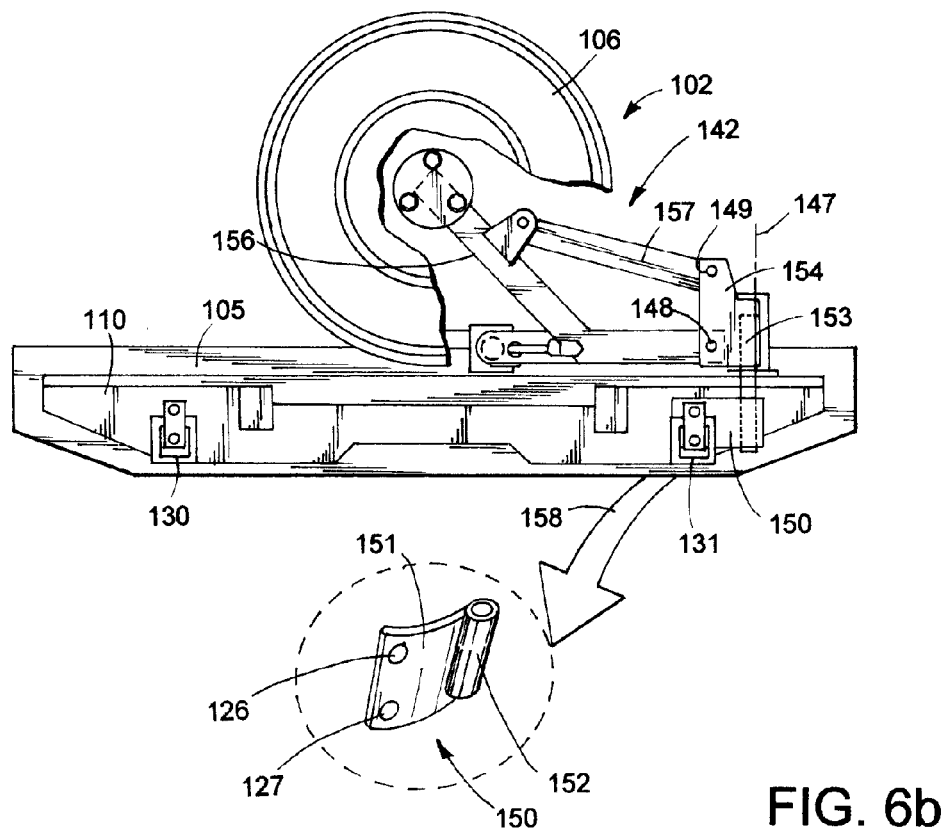
FIG. 6b is a side view of a tire carrier assembly rotatably mounted with a hinge bracket to the tire carrier support structure of FIG. 1.

FIG. 6b is a back view of spare tire carrier assembly 102 mounted to tire carrier support structure 110 in another way, in accordance with the invention. In this embodiment, tire carrier arm assembly 142 is connected to a bracket 154, which is similar to bracket 145 discussed above. One difference, however, is that bracket 154 does not include post sleeve 146. Instead, bracket 154 includes post 153 extending downwardly therefrom, wherein post 153 is sized and shaped to be received by a hinge bracket 150. In this embodiment, hinge bracket 150 is held to tire carrier support structure 110, which can be done in many different ways, such as with a coupler or by welding. In this embodiment, however, hinge bracket 150 is held to tire carrier support structure 110 using D-ring assembly 131.

Hinge bracket 150 can have many different configurations. In this embodiment, and as indicated by arrow 158, hinge bracket 150 includes a base portion 151 having throughholes 126 and 127 extending therethrough. Hinge bracket 150 also includes a hinge sleeve 152 connected to base portion 151. Hinge sleeve 152 has an opening sized and shaped to receive post 153. In this way, tire carrier arm assembly 142 is pivotably mounted to tire carrier support structure 110 with a hinge bracket. It should be noted that hinge bracket 150 can be made of a single piece or separate pieces. For example, base portion 151 and hinge sleeve 152 can be separate pieces attached together.

Figure 7:
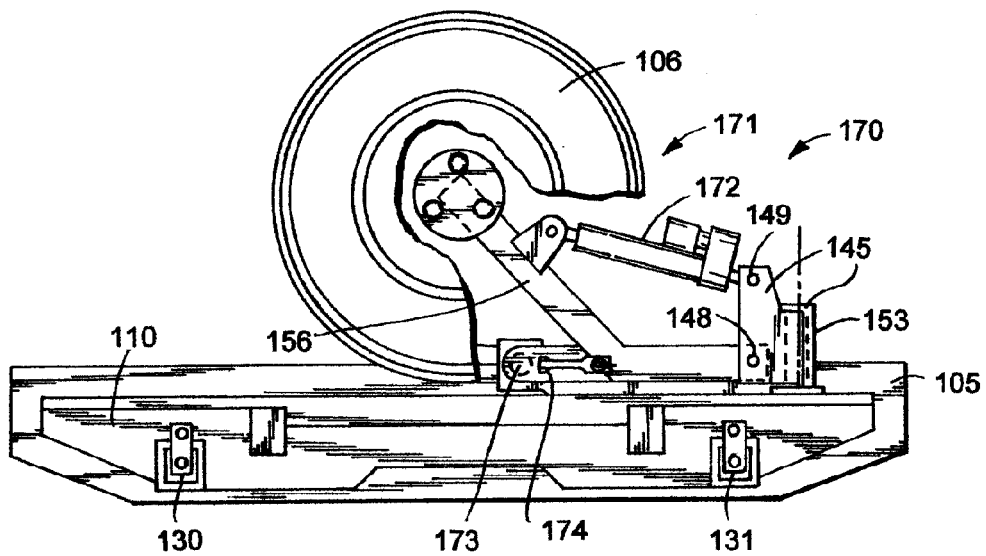
FIG. 7 is a side view of a tire carrier assembly having an actuator, wherein the tire carrier assembly is rotatably mounted with a post to the tire carrier support structure.

FIG. 7 is a back view of a spare tire carrier assembly 170 mounted to tire carrier support structure 110, in accordance with the invention. Spare tire carrier assembly 170 is rotatably mounted to spare tire support structure 110, as shown in FIG. 6a, so it is repeatably moveable between stowed and deployed conditions. However, it should be noted that tire carrier assembly 170 can be mounted as shown in FIG. 6b, if desired. In this embodiment, tire carrier assembly 170 is repeatably moveable between raised and lowered conditions. Spare tire carrier assembly 170 can be moved between raised and lowered conditions in many different ways, with one way being disclosed in U.S. Pat. No. 6,659,318 ("the '318 patent), which is incorporated herein by reference.

In this embodiment, spare tire carrier assembly 170 includes a tire carrier arm assembly 171. Tire carrier arm assembly 171 is similar to tire carrier arm assembly 142 and includes lower arm 156. However, upper arm 157 of assembly 142 has been replaced with an actuator 172, wherein actuator 172 is connected between lower arm 156 and upper connection point 149 on bracket 145. Actuator 172 allows tire carrier arm assembly 171 to be repeatably moveable between raised and lowered positions. Actuator 172 can be of many different types, such as a linear actuator. Examples of linear actuators include hydraulic and pneumatic cylinder actuators. One particular type of linear actuator is manufactured by Thompson Saginaw and is known as Model No. PPA23. More information about linear actuators can be found in the '318 patent mentioned above.

In another embodiment, actuator 172 includes a threaded sleeve and a threaded shaft operatively coupled together. The threaded shaft and threaded sleeve are operatively coupled together so they can be moved relative to each other in response to moving a hand grip. More information about actuators that include a threaded shaft and sleeve can be found in the '318 patent. It should be noted that, in FIG. 7, tire carrier support structure 110 is held to vehicle bumper 105 with D-ring assemblies, as discussed above with FIGS. 6a and 6b.

Figure 8C:
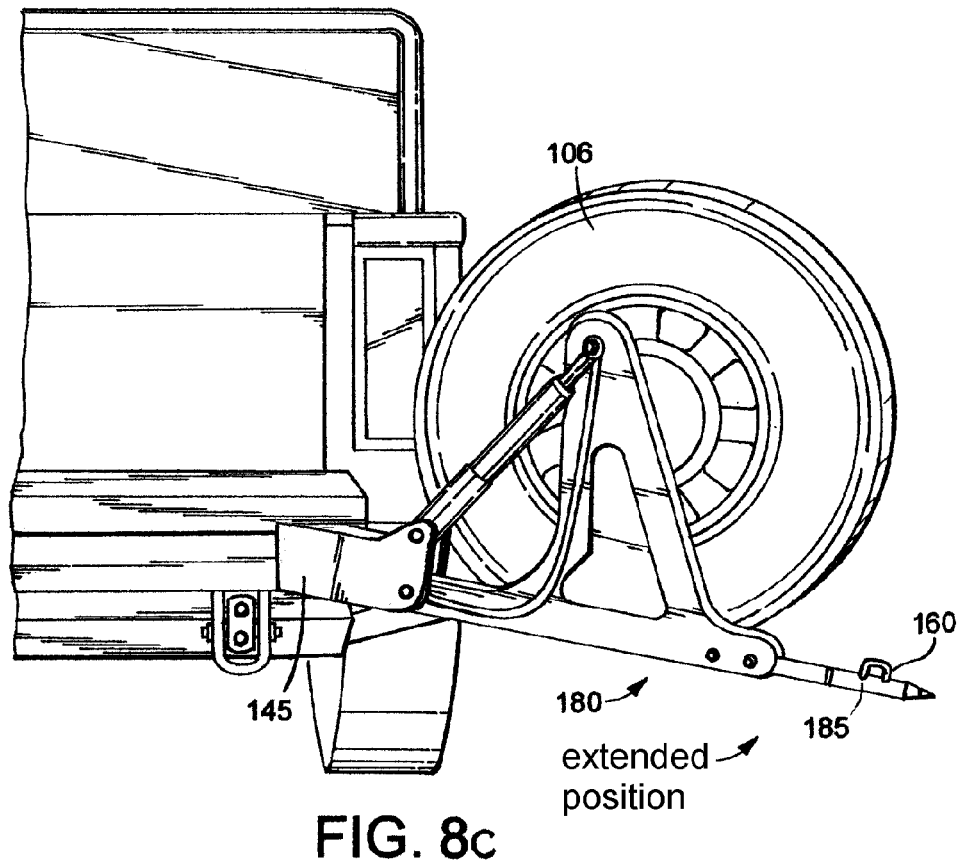
FIG. 8c is a perspective view of the tire carrier assembly of FIGS. 8a and 8b in a deployed condition.
Figure 8A:
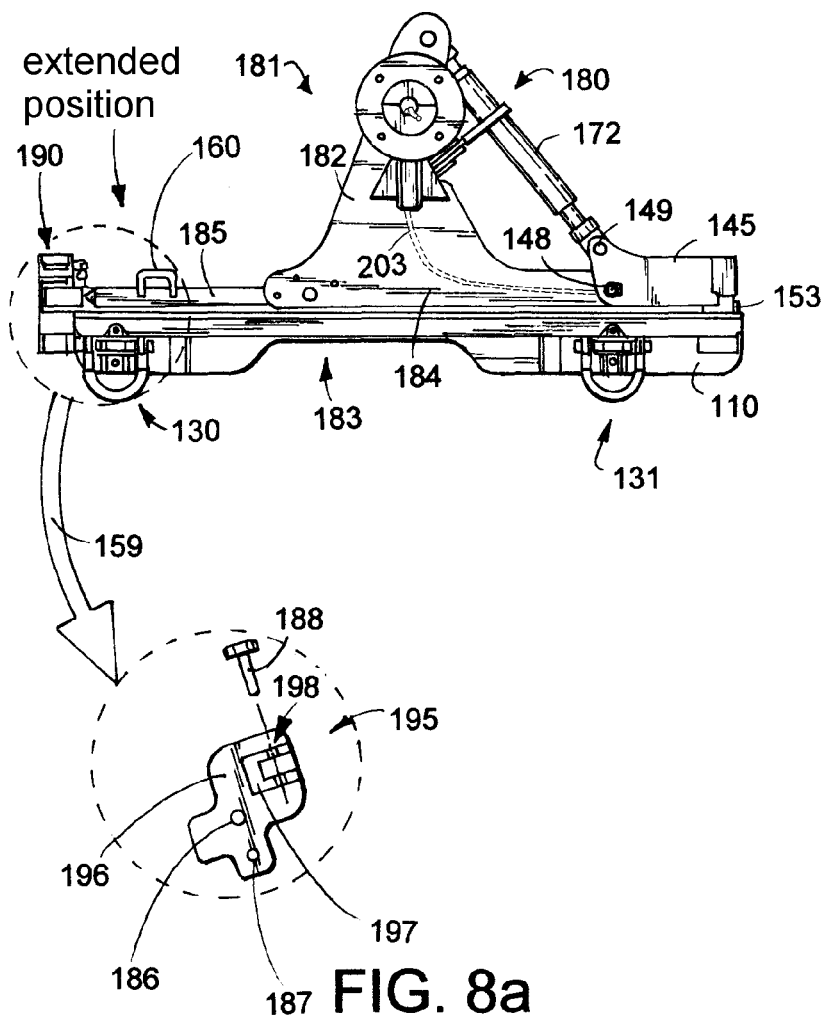
FIGS. 8a and 8b are perspective views of a tire carrier assembly having an actuator and pivot arm, in accordance with the invention.
Figure 8B:
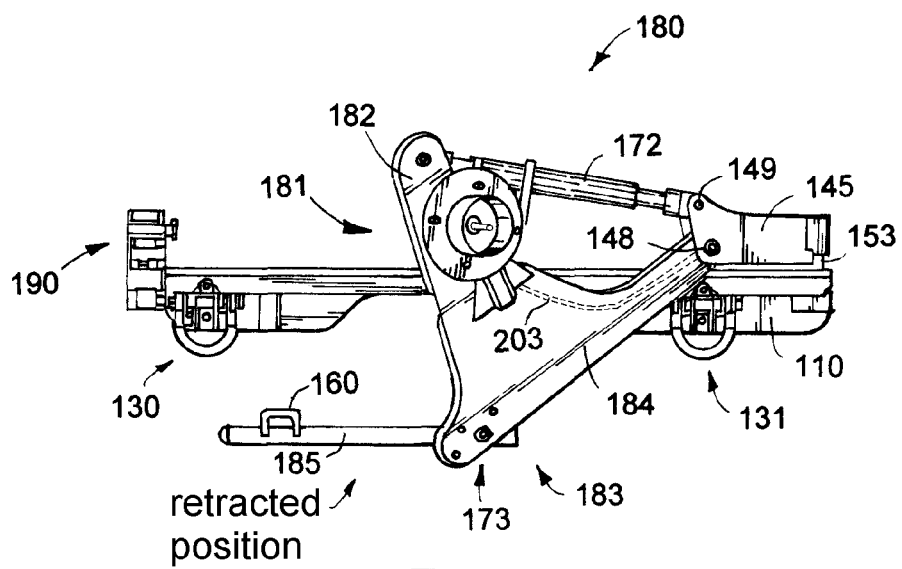

FIGS. 8a, 8b and 8c are back views of an embodiment of a spare tire carrier assembly 180, in accordance with the invention. In this embodiment, spare tire carrier assembly 180 is repeatably moveable between stowed and deployed conditions, as well as raised and lowered conditions. Spare tire carrier assembly 180 is shown in raised and stowed conditions in FIG. 8a and lowered and deployed conditions in FIG. 8b. Spare tire carrier assembly 180 is shown in raised and deployed conditions in FIG. 8c.

In this embodiment, spare tire carrier assembly 180 includes a tire carrier arm assembly 181 rotatably mounted to tire carrier support structure 110 with post 153, as discussed above and as shown in FIGS. 6a and 7. Tire carrier arm assembly 181 is similar to tire carrier arm assembly 171 and includes actuator 172. However, in this embodiment, lower arm 156 is replaced with a collapsible tire carrying piece 183. Collapsible tire carrying piece 183 includes an arm base portion 184 connected to bracket 145 at lower connection point 148 and a tire coupling portion 182 extending upwardly therefrom, wherein tire coupling portion 182 is for holding spare tire 106 (FIG. 8c). Actuator 172 extends between upper connection point 149 and tire coupling portion 182.

In accordance with the invention, collapsible tire carrying piece 183 includes a pivot arm 185 pivotably connected to arm base portion 181 at a pivot point 173. In this embodiment, pivot arm 185 includes a handle 160 attached thereto. Handle 160 is useful when moving tire carrier assembly 180 between its stowed and deployed conditions, as well as its raised and lowered conditions. By gripping handle 160 to move tire carrier assembly 180, a person is less likely to have his or her hand get caught between vehicle 100 and pivot arm 185.

Pivot arm 185 can be pivotably connected to tire carrying piece 183 in many different ways, such as with a hinge or bolt. Pivot arm 185 is repeatably moveable between extended positions, as shown in FIGS. 8a and 8c, and retracted positions, as shown in FIG. 8b. In the extended position, pivot arm 185 extends away from arm base portion 184 so it can be latched to a latch assembly 190, if desired. When pivot arm 185 is latched with latch assembly 190, tire carrier assembly 180 is held in its stowed condition. When pivot arm 185 is unlatched with latch assembly 190, tire carrier assembly 180 can be moved between its stowed and deployed conditions, as well as its raised and lowered conditions.

Pivot arm 185 can be moved between its extended and retracted positions in many different ways. In one way, pivot arm 185 is moved from its extended position to its retracted position in response to moving tire carrier arm assembly 181 from its raised position to its lowered position so that pivot arm 185 engages a support structure (not shown). The support structure is generally the structure supporting vehicle 100, such as the ground, a driveway or a road, by engaging its wheels 103 (FIG. 1). When pivot arm 185 engages the support structure, it rotates upwardly towards tire carrying piece 183, as shown in FIG. 8b. In this way, arm base portion 184 does not interfere with the lowering of spare tire 106 and its removal from tire carrier assembly 180. It should be noted that pivot arm 185 can be moved from its retracted position to its extended position in many other ways, such as by gripping handle 160.

It should also be noted that pivot arm 185 can be latched in many different ways, other than by using latch assembly 190. For example, as shown in FIGS. 8a and 8b and as indicated by a substitution arrow 159, latch assembly 190 can be replaced with a latch bracket 195. Latch bracket 195 can have many different configurations and can be positioned at many different locations. In this embodiment, however, latch bracket 195 includes a latch bracket body 196 with throughholes 186 and 187 extending therethrough. Throughholes 186 and 187 are for receiving bolts 111a and 111b, respectively, wherein bolts 111a and 111b extend through D-ring assembly 130, as well as latch bracket body 196. In this way, latch bracket 195 is held to tire carrier support structure 110 with a D-ring assembly. It should be noted, however, that latch bracket 195 can be held to tire carrier support structure 110 with a bolt head and washer in other embodiments.

In this embodiment, latch bracket 195 includes a latching body 197 attached to latch bracket body 196, wherein latching body 197 is for receiving the distal end of pivot arm 185. Latching body 197 includes throughholes 198 for receiving a pin 188. When the distal end of pivot arm 185 is received by latch bracket body 196, pin 188 is extended through throughholes 198 so that pivot arm 185 is latched between pin 188 and latching body 197. When pin 188 is removed from through-holes 198, pivot arm 185 is unlatched from between pin 188 and latching body 197 so that tire carrier arm assembly 181 can be moved between its stowed and deployed positions, as well as its raised and lowered positions. Another way in which pivot arm 185 can be latched is by using a ball socket, as will be discussed in more detail presently.

For example, as shown in FIGS. 6a and 6b, tire carrier assembly 170 includes a ball socket 173 mounted to base member 115 of tire carrier support structure 110, wherein ball socket 173 extends perpendicular to base member 115 and faces rearwardly and away from vehicle 100. In accordance with the invention, a ball socket housing 174 is included with tire carrier arm assembly 172 and extends outwardly from lower arm 156. Ball socket housing 174 is positioned so that it aligns with ball socket 173 when tire carrier arm assembly 171 is in its stowed position. More information about ball socket 173 and ball socket housing 174 can be found in the '318 patent mentioned above.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A vehicle, comprising:
a vehicle frame;
a tire carrier support structure attached to the vehicle frame with first and second elongate members, the tire carrier support structure extending the entire distance between the first and second elongate members;
a vehicle bumper carried by the vehicle frame and supported by the tire carrier support structure; and
a tire carrier arm assembly rotatably mounted to the tire carrier support structure;
wherein the tire carrier support structure includes a sidewall member which engages a center portion of the vehicle bumper, and a base member which extends perpendicular to the sidewall member.

2. The vehicle of claim 1, further including a first D-ring assembly through which the first elongate member extends.

3. The vehicle of claim 2, wherein the first D-ring assembly holds the tire carrier support structure to the vehicle bumper.

4. The vehicle of claim 1, wherein the tire carrier arm assembly is repeatably moveable between raised and lowered positions.

5. The vehicle of claim 2, further including a second D-ring assembly through which the second elongate member extends.

6. The vehicle of claim 5, wherein the tire carrier support structure has a first end which terminates between an end of the bumper and the first D-ring assembly, and a second end which terminates between an opposed end of the bumper and the second D-ring assembly.

7. The vehicle of claim 1, wherein the tire carrier support structure engages a center portion of the vehicle bumper, wherein the center portion is proximate to a midpoint between the elongate members.

8. The vehicle of claim 1, wherein the sidewall member engages the first and second elongate members.

9. The vehicle of claim 2, wherein the pair of elongate members extend through the sidewall member.

10. The vehicle of claim 1, further including a latch assembly and first D-ring assembly, wherein the latch assembly is fastened to the tire carrier support structure by the first D-ring assembly.

11. The vehicle of claim 10, further including a hinge bracket and second D-ring assembly, wherein the hinge bracket is fastened to the tire carrier support structure by the second D-ring assembly.

12. The vehicle of claim 11, wherein the first and second D-ring assemblies engage the tire carrier support structure.

13. The vehicle of claim 11, wherein the tire carrier support structure includes a sidewall member and a base member perpendicular to the sidewall member, and the first and second D-ring assemblies engage the sidewall member.

14. A vehicle, comprising:
a vehicle bumper attached to a vehicle frame;
a tire carrier support structure;
a pair of elongate members which attach the tire carrier support structure to opposite skies of the vehicle frame, the tire carrier support structure extending the entire distance between the elongate members;
a tire carrier assembly carried by the tire carrier support structure:
wherein the tire carrier support structure includes a sidewall member which supports the vehicle bumper along its length, and a base member, wherein the base member extends perpendicular to the sidewall member.

15. The vehicle of claim 14, further including a pair of D-ring assemblies connected to corresponding elongate members, the D-ring assemblies holding the tire carrier support structure to the vehicle bumper.

16. The vehicle of claim 15, wherein the tire carrier support structure extends between the D-ring assemblies.

17. The vehicle of claim 15, further including a hinge bracket fastened to the tire carrier support structure by one of the D-ring assemblies, the tire carrier assembly being mounted to the hinge bracket.

18. The vehicle of claim 14, wherein the tire carrier assembly is moveable between raised and lowered positions.

19. The vehicle of claim 18, wherein the tire carrier assembly includes first and second arm portions pivotably connected together.

20. The vehicle of claim 17, further including, a latch assembly fastened to the tire carrier support structure by another of the D-ring assemblies.

21. The vehicle of claim 20, wherein the tire carrier support structure extends between the hinge bracket and latch assembly.

22. The vehicle of claim 14, further including a latch assembly and first D-ring assembly, wherein the latch assembly is fastened to the tire carrier support structure by the first D-ring assembly.

23. A vehicle, comprising:
a vehicle frame which carries a vehicle bumper;
a tire carrier support structure;
elongate members which attach the tire carrier support structure to opposite sides of the vehicle frame;
a pair of D-ring assemblies, one D-ring assembly being attached to the elongate members attached to one side of the frame and the other D-ring assembly being attached to the elongate members attached to the other side of the frame;
wherein the tire carrier support structure extends the entire distance between the D-ring assemblies;
wherein the tire carrier support structure includes a base member and a post carried by the base member, and a sidewall member perpendicular to the base member.

24. The vehicle of claim 23, wherein the sidewall member supports a center portion of the vehicle bumper, wherein the center portion is proximate to a midpoint between the pair of D-ring assemblies.

25. The vehicle of claim 23, further including a tire carrier assembly carried by the post.

26. The vehicle of claim 25, wherein the tire carrier assembly is moveable between raised and lowered positions.

27. The vehicle of claim 26, wherein the tire carrier assembly includes first and second arm portions pivotably connected together.

28. The vehicle of claim 27, wherein the first arm portion rotates upwardly in response to the tire carrier assembly being moved to its lowered position.

29. The vehicle of claim 25, wherein the tire carrier assembly is rotatably mounted to the post.

* * * * *